(12) United States Patent
Pack

(10) Patent No.: US 6,793,028 B2
(45) Date of Patent: Sep. 21, 2004

(54) MOUNTING ARRANGEMENT FOR A RADIATOR ASSEMBLY OF A WORK MACHINE

(75) Inventor: William Pack, South Shields (GB)

(73) Assignee: Caterpillar S.A.R.L., Geneva (*) Notice: Subject to any disclaimer, the term of this patent is extended or adjusted under 35 U.S.C. 154(b) by 0 days.

(21) Appl. No.: 09/309,844

(22) Filed: May 11, 1999

(65) Prior Publication Data

US 2002/0053480 A1 May 9, 2002

(51) Int. Cl.⁷ .............................................. B60K 11/04
(52) U.S. Cl. ..................................... 180/68.1; 180/68.4
(58) Field of Search ............................. 180/68.1, 68.2, 180/68.4, 68.3, 68.5, 68.6

(56) References Cited

U.S. PATENT DOCUMENTS

| | | | | |
|---|---|---|---|---|
| 922,489 A | * | 5/1909 | Lea ............................ | 180/68.4 |
| 1,263,543 A | | 4/1918 | Fageol | |
| 1,357,397 A | | 11/1920 | Gerber | |
| 1,856,773 A | * | 5/1932 | Masury ....................... | 180/68.1 |
| 1,979,191 A | * | 10/1934 | Burney ........................ | 180/54 |
| 2,228,550 A | | 1/1941 | Young ......................... | 257/136 |
| 2,247,962 A | * | 7/1941 | Ormsby et al. ............. | 180/68.4 |
| 2,503,411 A | * | 4/1950 | Prouse ....................... | 180/68.4 |
| 2,626,783 A | | 1/1953 | Fritzberg ..................... | 257/146 |
| 2,650,799 A | | 9/1953 | Fritzberg ..................... | 257/146 |
| 2,789,647 A | * | 4/1957 | Couse ......................... | 180/68.4 |
| 3,406,751 A | | 10/1968 | Kreul et al. ................. | 165/151 |
| 3,540,540 A | | 11/1970 | Schwab ....................... | 180/68 |
| 3,715,001 A | * | 2/1973 | Wilson ........................ | 180/68.4 |
| 3,827,523 A | * | 8/1974 | Williams ..................... | 180/68.4 |
| 3,929,202 A | * | 12/1975 | Hobbensiefken ........... | 180/68.4 |
| 3,934,644 A | * | 1/1976 | Johnston ..................... | 180/68.4 |
| 4,160,487 A | * | 7/1979 | Kunze et al. ................ | 180/68 |
| 4,345,641 A | * | 8/1982 | Hauser ........................ | 165/41 |
| 4,362,208 A | * | 12/1982 | Hauser ........................ | 180/68.4 |
| 4,472,100 A | * | 9/1984 | Wagner ....................... | 414/481 |
| 4,664,074 A | * | 5/1987 | Otani et al. ................ | 123/41.31 |
| 4,696,361 A | | 9/1987 | Clark et al. ................. | 180/68.4 |
| 4,730,664 A | | 3/1988 | Forsthuber et al. .......... | 165/41 |
| 4,938,303 A | | 7/1990 | Schaal et al. ............... | 180/68.1 |
| 5,129,446 A | | 7/1992 | Beamer ........................ | 165/41 |
| 5,341,870 A | | 8/1994 | Hughes et al. .............. | 165/110 |
| 5,695,007 A | | 12/1997 | Fauconnier et al. ........ | 165/128 |
| 5,785,139 A | * | 7/1998 | Freedy et al. .............. | 180/68.4 |
| 6,386,306 B2 | * | 5/2002 | Contoli et al. ............. | 180/68.4 |
| 6,435,264 B1 | * | 8/2002 | Konno et al. ............... | 165/41 |

* cited by examiner

Primary Examiner—Brian L. Johnson
Assistant Examiner—Jeffrey J. Restifo
(74) Attorney, Agent, or Firm—John J Cheek

(57) ABSTRACT

The addition of emission control devices to engines of work machines has increased the cooling demands placed on the engine cooling system. This increased cooling demand can lead to the use of larger engine heat exchangers, thus requiring larger engine enclosures that may restrict the visibility of the machine operator. In accordance with one aspect of this invention, the engine enclosure of a work machine is devoid of an heat exchanger. An engine heat exchanger is mounted to a machine frame rearward of an operator cab and positioned so that an upper edge of the heat exchanger cooling core extends along a line that intersects the longitudinal axis of the machine frame at an angle other than 90°. This arrangement permits the use of a larger heat exchanger without substantially obstructing the view of the machine operator.

23 Claims, 3 Drawing Sheets

MOUNTING ARRANGEMENT FOR A RADIATOR ASSEMBLY OF A WORK MACHINE

TECHNICAL FIELD OF THE INVENTION

The present invention relates generally to radiators, and more particularly to a mounting arrangement for a radiator assembly of a work machine.

BACKGROUND OF THE INVENTION

A work machine, such as a dump truck, typically includes a cab assembly and an engine enclosure attached to a main frame. The cab assembly and engine enclosure are attached to the main frame such that the cab assembly is located behind the engine enclosure. The engine enclosure houses the radiator assembly and the engine of the work machine. The radiator assembly functions to cool the engine and thus maintain it within a predetermined temperature operating range.

The addition of emission control devices to the engines of work machines has increased the cooling demands placed upon the radiator assembly. In order to accommodate these increased cooling demands the size of the radiator assembly must be increased. While increasing the size allows the radiator assembly to accommodate the aforementioned increased cooling demands, it also results in causing other problems for an operator of the work machine. For example, increasing the size of the radiator assembly results in having to increase the size of the engine enclosure in order to accommodate the radiator assembly. Increasing the size of the engine enclosure tends to obstruct the forward view of an operator positioned within the cab assembly when operating the work machine. Obstructing the view of the operator is an annoyance and decreases the efficiency of the work machine in performing various work functions.

What is needed therefore is a mounting arrangement for a radiator assembly of a work machine which overcomes the above-mentioned drawback.

DISCLOSURE OF THE INVENTION

In accordance with a first embodiment of the present invention, there is provided a work machine. The work machine includes a main frame and an engine assembly mounted on the main frame. The work machine also includes a radiator assembly mounted on the main frame. The work machine further includes a transmission assembly (i) mechanically coupled to the engine assembly and (ii) mounted on the main frame such that the transmission assembly is interposed between the engine assembly and the radiator assembly.

In accordance with a second embodiment of the present invention, there is provided a work machine. The work machine includes a main frame and an engine assembly mounted on the main frame. The work machine also includes a radiator assembly mounted on the main frame. The work machine further includes a cab assembly mounted on the main frame such that the cab assembly is interposed between the engine assembly and the radiator assembly.

In accordance with a third embodiment of the present invention there is provided a work machine. The work machine includes a main frame and an engine assembly mounted on the main frame. The work machine also includes a radiator assembly mounted on the main frame. The work machine further includes a cab assembly mounted on the main frame such that the cab assembly is interposed between the engine assembly and the radiator assembly. The work machine also includes (i) a work implement coupled to the main frame and (ii) a ground engaging mechanism mechanically coupled to the engine assembly, wherein actuation of the ground engaging mechanism by the engine assembly causes the work machine to be advanced over a ground segment.

BEST MODE FOR CARRYING OUT THE INVENTION

Figure 1:
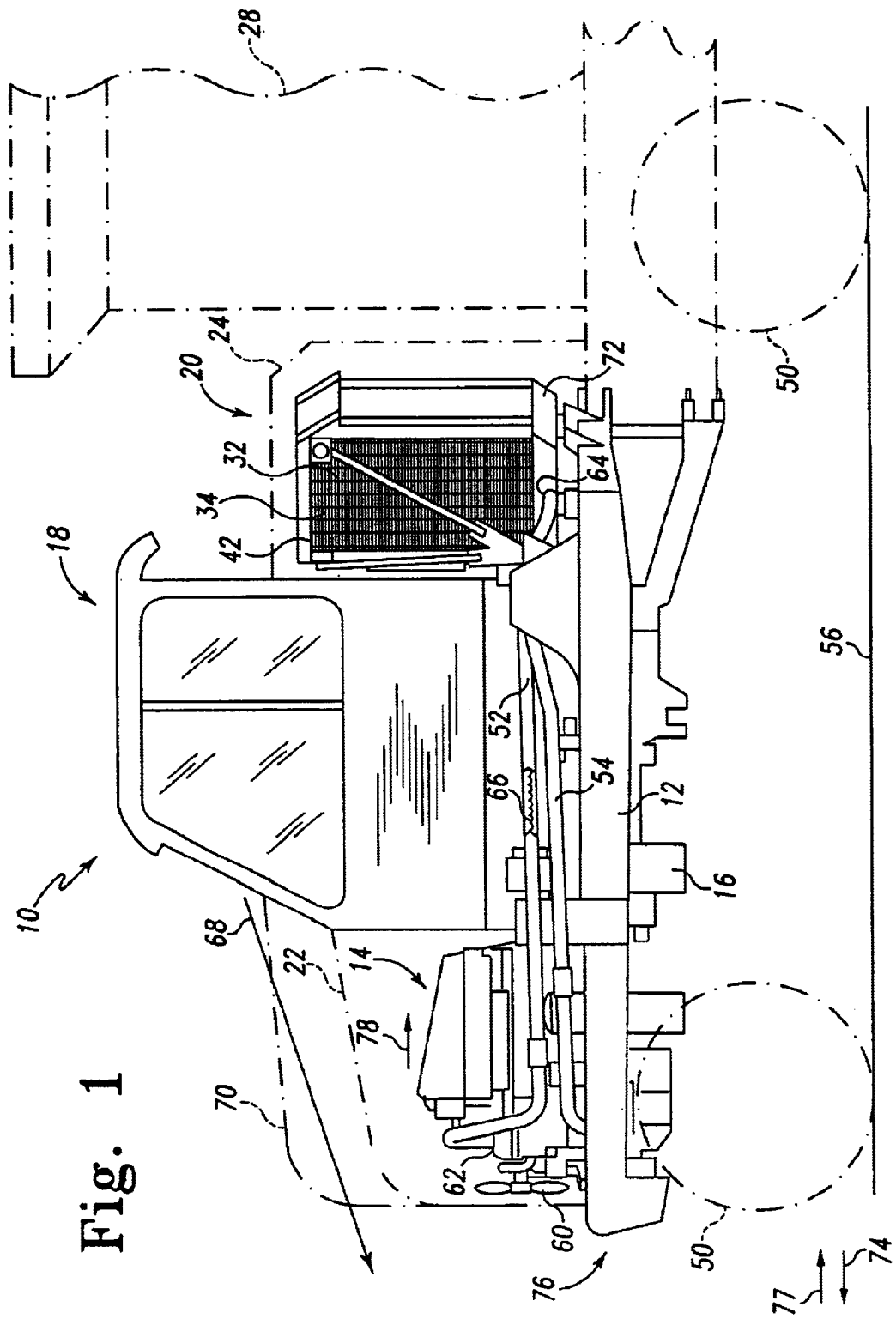
FIG. 1 is a side elevational view of a work machine which incorporates the features of the present invention therein (note that the engine enclosure, the cowling, the ground engagement mechanism, and the implement of the work machine are shown in phantom for clarity of description)

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
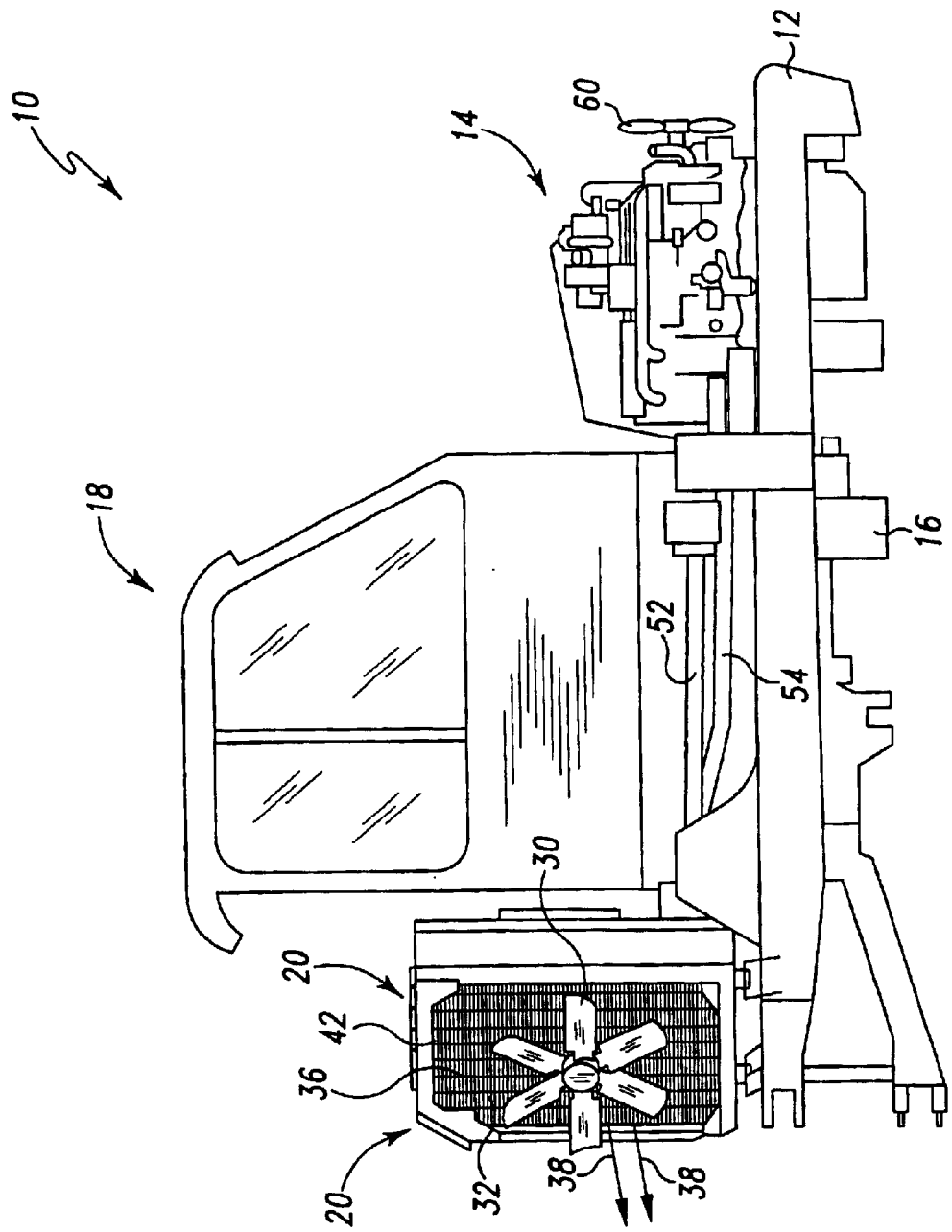
FIG. 2 is another side elevational view of the work machine of FIG. 1 (note that the engine enclosure, the cowling, the ground engagement mechanism, and the implement of the work machine are not shown for clarity of description)
Figure 3:
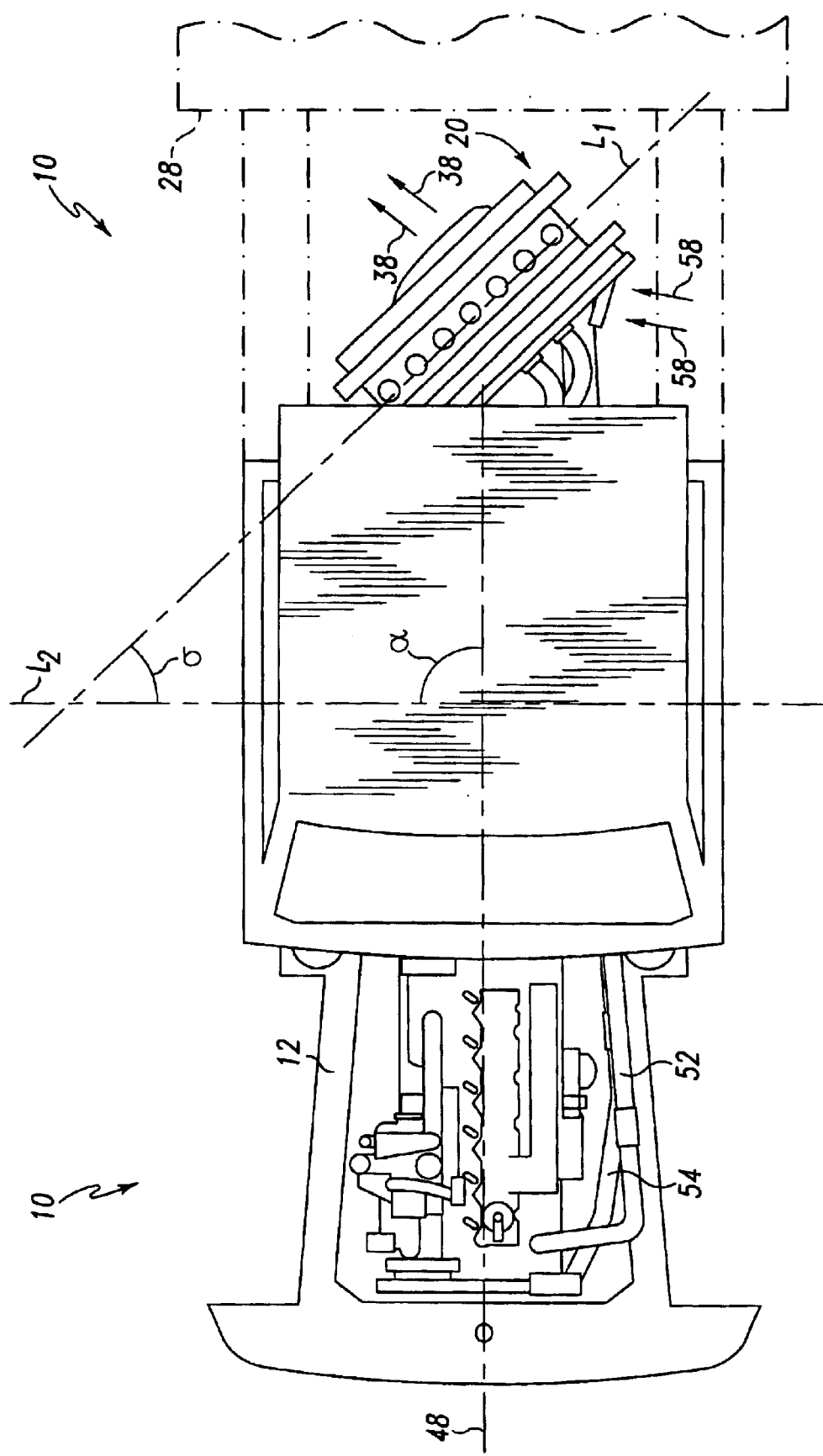
FIG. 3 is a top elevational view of the work machine shown in FIG. 1 (note that the engine enclosure, the cowling, the ground engagement mechanism, and the implement of the work machine are not shown for clarity of description).

Referring now to FIGS. 1, 2, and 3, there is shown a work machine 10 which incorporates the features of the present invention therein. Work machine 10 includes a main frame 12, an engine assembly 14, a radiator assembly 20, and a transmission assembly 16. Work machine 10 also includes a cab assembly 18, a work implement 28, an engine fan 60, a pair of conduits 52 and 54, and a ground engaging mechanism 50.

It should be understood that ground engaging mechanism 50 can include wheels as specifically shown in FIG. 1. In the alternative, ground engaging mechanism 50 can also include a track chain (not shown) of the type typically utilized on crawler tractors. Moreover, it should be understood that work implement 28 can include a truck bed as shown in FIG. 1. In the alternative, work implement 28 can include other types of work implements such as (i) a bucket for moving earth or (ii) an earth moving blade of the type typically found on crawler tractors.

As shown in FIGS. 1 and 2, radiator assembly 20 includes a radiator fan 30 and a cooling core 32 having (i) an upper edge 42, (ii) a fluid inflow surface 34, and (iii) a fluid outflow surface 36. Radiator assembly 20 also includes a frame 72 which supports cooling core 32.

As shown more clearly in FIG. 1, conduit 52 has a first end 62 and a second end 64. Conduit 54 also has a first end (not shown) and a second end (not shown).

Engine assembly 14 is mounted on main frame 12 and enclosed by an engine enclosure 22. Transmission assembly 16 is also mounted on main frame 12. In addition, transmission assembly 16 is mechanically coupled to engine assembly 14 and ground engaging mechanism 50. Furthermore, it should be understood that the above described arrangement results in ground engaging mechanism 50 being mechanically coupled to engine assembly 14 via transmission assembly 16. Therefore, the actuation of engine assembly 14 results in the actuation of ground engaging assembly 50 so as to advance work machine 10 over a ground segment 56 in a direction indicated by arrow 74. Note that ground engaging assembly 50 can also be actuated by engine assembly 14 so as to advance work machine 10 over ground segment 56 in a direction indicated by arrow 76.

Radiator assembly 20 is also mounted on main frame 12 and enclosed by a radiator cowling 24. It should be appreciated that radiator assembly 20 is mounted on main frame 12 such that transmission assembly 16 is interposed between engine assembly 14 and radiator assembly 20. In addition, radiator assembly 20 is mounted on main frame 12 so that cooling core 32 is interposed between radiator fan 30 and engine assembly 14. Preferably, as shown in FIG. 3, radiator assembly 20 is mounted on main frame 20 such that cooling core 32 of radiator assembly 20 is positioned at an angle relative to the longitudinal axis 48 of main frame 12. In particular, radiator assembly 20 is positioned such that (i) a linear extension of upper edge 42 of cooling core 32 defines a line $L_1$, (ii) a line $L_2$ is defined by a line which intersects the longitudinal axis 48 of main frame 12 so as to define a 90° angle α therebetween, (iii) an angle σ is defined between line $L_1$ and line $L_2$, and (iv) $40.0° \leq \sigma \leq 95.0°$.

As shown in FIG. 1, work implement 28 is mechanically coupled to main frame 12 such that radiator assembly 2018 interposed between work implement 28 and engine assembly 14. However, it should be understood that a work implement 28, such as an earth moving blade (not shown), can also be mechanically coupled to a front portion 77 of main frame 12 so that engine assembly 14 is interposed between work implement 28 and radiator assembly 20.

Cab assembly 18 is also mounted on main frame 12. In particular, cab assembly 18 is mounted on main frame 12 such that cab assembly 18 is interposed between engine assembly 14 and radiator assembly 20.

Engine fan 60 is mounted on main frame 12 such that engine assembly 14 is interposed between engine fan 60 and radiator fan 30 (see FIG. 2).

First end 62 of conduit 52 is coupled to engine assembly 14. Second end 64 of conduit 52 is coupled to radiator assembly 20. In particular, second end 64 of conduit 52 is coupled to cooling core 32 of radiator assembly 20. The first end and second end of conduit 54 are also respectively coupled to engine assembly 14 and to cooling core 32 of radiator assembly 20 in a manner similar to that described above for conduit 52. It should be appreciated that the above described arrangement places engine assembly 14 in fluid communication with radiator assembly 20 such that a cooling fluid 66 (see FIG. 1) can be circulated through engine assembly 14 and radiator assembly 20 via conduits 52 and 54.

INDUSTRIAL APPLICABILITY

During the operation of work machine 10 relatively hot cooling fluid 66 is advanced from engine assembly 14 to cooling core 32 of radiator assembly 20 via conduit 52 by a pump (not shown). In addition, radiator fan 30 is actuated so that relatively cool air is pulled through fluid inflow surface 34 (see FIG. 1) of cooling core 32 in the direction indicated by arrows 58 (see FIG. 3). The aforementioned air then exits cooling core 32 in the direction indicated by arrows 38 (see FIG. 3) via fluid outflow surface 36 (see FIG. 2).

It should be appreciated that advancing air through cooling core 32 in the above described manner places the air and the relatively hot cooling fluid 66 in a heat exchange relationship. In particular, as the relatively cool air is draw through cooling core 32, heat is transferred from the relatively hot cooling fluid 66 to the relatively cool air. This heat exchange causes the temperature of the air passing through cooling core 32 to increase, and the temperature of the cooling fluid 66 to decrease. Once cooling fluid 66 passes through cooling core 32 (and therefore the temperature of cooling fluid 66 has been decreased), cooling fluid 66 is returned to engine assembly 14 via conduit 54 such that heat is transferred from engine assembly 14 to cooling fluid 66. Cooling fluid 66 is then advanced back to cooling core 32 where the above described process is repeated. The aforementioned heat exchange that takes place as a result of circulating cooling fluid 66 through engine assembly 14 and cooling core 32 in the above described manner helps maintain engine assembly 14 within predetermined temperature operating limits.

In addition to actuating radiator fan 30, engine fan 60 is also actuated so as to advance relatively cool air over engine assembly 14 in a direction indicated by arrow 78. Advancing air over engine assembly 14 with engine fan 60 in the above described manner helps to maintain engine assembly 14 within the predetermined temperature operating limits.

It should be appreciated that mounting radiator assembly 20 in the above described manner has several advantages. For example, mounting radiator assembly 20 on main frame 12 such that radiator assembly 20 is located behind cab assembly 18, and therefore is not enclosed within engine enclosure 22, eliminates the need for engine enclosure 22 to be large enough to accommodate radiator assembly 20. Therefore, the size of engine enclosure 22 can be reduced as compared to when radiator assembly 20 is contained within the engine enclosure. For example, as shown in FIG. 1, engine enclosure 70 represents the size an engine enclosure would have to be in order to accommodate radiator assembly 20. Reducing the size of the engine enclosure to the size of engine enclosure 22 allows an operator (not shown) to have a relatively unobstructed forward view from within cab assembly 18 as represented by arrow 68. This is in contrast to when the engine enclosure is the size of engine enclosure 70 since engine enclosure 70 results in having a relatively obstructed forward view from cab assembly 18.

Another advantage of mounting radiator assembly 20 in the above described manner is that the air flow through radiator assembly 20 is directed away from cab assembly 18. In particular, as discussed above, air is advanced through cooling core 32 in the direction indicated by arrows 58 and 38 (see FIG. 3). As previously discussed, the air is heated as it passes through cooling core 32, thus the air represented by arrows 38 is relatively hot as compared to the air represented by arrows 58. As shown in FIG. 3, the relatively hot air as represented by arrows 38 is directed away from cab assembly 18. This is in contrast to when the radiator assembly is located within the engine enclosure since this configuration results in the relatively hot air being directed toward cab assembly 18 in the direction indicated by arrow 78. Directing the relatively hot air toward cab assembly 18 tends to increase the temperature within cab assembly 18 and thus make it uncomfortable for an operator positioned therein. On the other hand, positioning radiator assembly 20 as described herein results in the relatively hot air being directed away from cab assembly 18, and thus facilitates keeping cab assembly 18 within comfortable temperature limits.

Another advantage of mounting radiator assembly 20 in the above described manner is that the air flow through radiator assembly 20 is directed away from any obstacles. As shown in FIG. 3, the air flow (as represented by arrows 38) is directed away from work implement 28 and toward an unobstructed area. Directing the air flow to an unobstructed area facilitates the ability of radiator fan 30 to draw a relatively large volume of air through cooling core 32, and thus increases the heat exchange capacity of radiator assembly 20. Increasing the heat exchange capacity of radiator assembly 20 facilitates its ability to maintain engine assembly 14 within acceptable predetermined temperature limits.

This is in contrast to other arrangements where the radiator assembly is positioned such that air advanced through the cooling core is directed onto an obstacle, e.g. the engine block. As a result, the radiator fan's ability to advance a large volume of air through the cooling core of the radiator assembly is decreased. Decreasing the radiator fan's ability to advance a large volume of air through the cooling core decreases the heat exchange capacity of the radiator assembly which in turn decreases its ability to maintain engine assembly 14 within acceptable predetermined temperature limits.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A work machine, comprising:

a main frame;

an engine assembly mounted on said main frame;

a radiator assembly mounted on said main frame, said radiator assembly operable to cool said engine assembly; and a transmission assembly (i) mechanically coupled to said engine assembly and (ii) mounted on said main frame such that said transmission assembly is interposed between said engine assembly and said radiator assembly;

said main frame has a longitudinal axis;

said radiator assembly includes a cooling core having a fluid inflow surface and a fluid outflow surface;

said cooling core is positioned relative to said longitudinal axis such that (i) at least one of said fluid inflow surface and said fluid outflow surface extends substantially parallel to a first line, (ii) a second line intersects said longitudinal axis so as to define a 90° angle α therebetween, and (iii) an angle σ is defined between said first line and said second line, and (iv) $40.0° \leq \sigma \leq 95.0°$.

2. The work machine of claim 1, further comprising a cab assembly mounted on the main frame, wherein said cab assembly is interposed between said engine assembly and said radiator assembly.

3. The work machine of claim 1, further comprising:

a work implement coupled to said main frame; and said radiator assembly is interposed between said work implement and said engine assembly.

4. The work machine of claim 3, wherein:

said work implement includes a truck bed.

5. The work machine of claim 1, wherein:

said radiator assembly includes a radiator fan and said cooling core is interposed between said radiator fan and said engine assembly.

6. The work machine of claim 5, further comprising an engine fan mounted on said main frame, wherein:

said engine assembly is interposed between the engine fan and said radiator fan.

7. The work machine of claim 1, further comprising:

a conduit having (i) a first end attached to said engine assembly, (ii) a second end attached to said radiator assembly, and (iii) said engine assembly is in fluid communication with said radiator assembly; and a cooling fluid which is advanced from said radiator assembly to said engine assembly through said conduit.

8. The work machine of claim 1, further comprising:

a ground engaging mechanism mechanically coupled to said engine assembly; and wherein actuation of said ground engaging mechanism by said engine causes said work machine to be advanced over a ground segment.

9. A work machine, comprising:

a main frame;

an engine assembly mounted on said main frame;

a radiator assembly mounted on said main frame, said radiator assembly operable to cool said engine assembly; and a cab assembly mounted on said main frame such that said cab assembly is interposed between said engine assembly and said radiator assembly;

said main frame having a longitudinal axis;

said radiator assembly includes a cooling core having a fluid inflow surface and a fluid outflow surface; and said cooling core is positioned relative to said longitudinal axis such that (i) at least one of said fluid inflow surface and said fluid outflow surface extends substantially parallel to a first line, (ii) a second line intersects said longitudinal axis so as to define a 90° angle α therebetween, and (iii) an angle σ is defined between said first line and said second line, and (iv) $40.0° \leq \sigma \leq 95.0°$.

10. The work machine of claim 9, further comprising:

a work implement coupled to said main frame; and said radiator assembly is interposed between said work implement and said cab assembly.

11. The work machine of claim 9, wherein:

said work implement includes a truck bed.

12. The work machine of claim 9, wherein:

said radiator assembly includes a radiator fan and said cooling core is interposed between said radiator fan and said cab assembly.

13. The work machine of claim 12 further comprising an engine fan mounted on said main frame, wherein:

said engine assembly is interposed between the engine fan and said radiator fan.

14. The work machine of claim 9, further comprising:

a conduit having (i) a first end attached to said engine assembly, (ii) a second end attached to said radiator assembly, and (iii) said engine assembly is in fluid communication with said radiator assembly; and a cooling fluid which is advanced from said radiator assembly to said engine assembly through said conduit.

15. The work machine of claim 9, further comprising:

a ground engaging mechanism mechanically coupled to said engine assembly; and wherein actuation of said ground engaging mechanism by said engine causes said work machine to be advanced over a ground segment.

16. A work machine, comprising:

a frame having a longitudinal axis;

an operator cab mounted on said frame;

an engine enclosure mounted on said frame forward of said operator cab;

an engine assembly mounted on said frame and located within said engine enclosure, said engine assembly including an engine and an engine fan directing cooling air over said engine, said engine enclosure being devoid of a radiator assembly operable to cool said engine assembly; and a radiator assembly mounted to said frame rearward of said operator cab, said radiator assembly operable to cool said engine assembly, said radiator assembly including a cooling core having a fluid inflow surface and a fluid outflow surface, said cooling core being positioned such that at least one of said fluid inflow surface and said fluid outflow surface extends substantially parallel to a line that intersects the longitudinal axis of said frame at an angle other than 90°.

17. The work machine of claim 16 wherein said radiator assembly includes a radiator fan positioned rearward of said cooling core.

18. The work machine of claim 17 wherein said radiator fan is operable to draw air through said radiator assembly and away from said operator cab.

19. The work machine of claim 16, further comprising:

a transmission assembly mounted on said frame and operably connected with said engine assembly, said transmission assembly being located between said engine assembly and said radiator assembly.

20. The work machine of claim 16 wherein said engine enclosure includes an upper surface extending downwardly and forwardly from said operator cab, said engine enclosure upper surface terminating at a forward end positioned at a first distance above said frame, and wherein the upper edge of said cooling core is positioned a second distance above said frame, said second distance being greater than said first distance.

21. A work machine, comprising:

a frame;

an operator cab mounted on said frame;

an engine enclosure mounted on said frame forward of said operator cab, said engine enclosure including an upper surface extending downwardly and forwardly from said operator cab, said engine enclosure upper surface terminating at a forward end positioned at a first distance above said frame;

an engine assembly mounted on said frame and located within said engine enclosure; and a radiator assembly mounted to said frame rearward of said operator cab, said assembly operable to cool said engine assembly and including a cooling core having an upper edge positioned a second distance above said frame, said second distance being greater than said first distance, said cooling core having a fluid inflow surface and a fluid outflow surface and being positioned such that at least one of said fluid inflow surface and said fluid outflow surface extends substantially parallel to a line that intersects a longitudinal axis of said frame at an angle other than 90°.

22. The work machine of claim 21 wherein said engine assembly includes an engine and an engine fan directing cooling air over said engine.

23. The work machine of claim 21 further comprising:

a transmission assembly mounted on said frame and operably connected with said engine assembly, said transmission assembly being located between said engine assembly and said radiator assembly.

* * * * *